US012730821B2

(12) United States Patent
Kalgudi et al.

(10) Patent No.: US 12,730,821 B2
(45) Date of Patent: Sep. 8, 2026

(54) AUTOMATING FUNCTIONAL SAFETY SCORING FOR APPLICATIONS

(71) Applicant: Red Hat, Inc., Raleigh, NC (US)

(72) Inventors: Sameera Kalgudi, Lansing, MI (US); Pierre-Yves Chibon, Puteaux (FR); Khaled Sulayman, Boston, MA (US); Michael Weng Keong Ho, Grasbrunn (DE); Ryan Smith, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 363 days.

(21) Appl. No.: 18/110,483

(22) Filed: Feb. 16, 2023

(65) Prior Publication Data

US 2024/0281447 A1 Aug. 22, 2024

(51) Int. Cl.
*G06F 16/2457* (2019.01)
*G06F 9/448* (2018.01)

(52) U.S. Cl.
CPC ........ *G06F 16/24578* (2019.01); *G06F 9/448* (2018.02)

(58) Field of Classification Search
CPC ........................... G06F 16/24578; G06F 9/448
USPC .......................................................... 707/749
See application file for complete search history.

(56) References Cited

U.S. PATENT DOCUMENTS 10,445,090 B2 10/2019 Desai et al.
2014/0173548 A1 6/2014 Greb et al.
2014/0304505 A1* 10/2014 Dawson .............. G06F 21/6227 713/165
2017/0287233 A1* 10/2017 Nix ........................ G08G 1/166
2018/0278631 A1* 9/2018 Harris ................. H04L 63/1416
2019/0251114 A1* 8/2019 Pereira ................ G06F 16/7847
2021/0097186 A1* 4/2021 Mandal ................. G06F 21/552
(Continued)

FOREIGN PATENT DOCUMENTS

CN 104267272 B 6/2017
CN 110147654 B 11/2021
(Continued)

OTHER PUBLICATIONS

Jay Thomas, et al. "Foundational Software for Functional Safety", Texas Instruments: May 2015, SPNY007, pp. 1-7, Dallas, Texas; 7 Pages.

*Primary Examiner* — Tony Mahmoudi
(74) *Attorney, Agent, or Firm* — Kilpatrick Townsend & Stockton LLP

(57) ABSTRACT

The present disclosure provides new and innovative systems and methods for automating functional safety scoring in applications. An example method includes a computing device having a processor detecting a requirement to generate a functional safety score for at least a portion of a program. The functional safety score may be based on a functional safety standard (e.g., the ISO 26262 standard). The method may further include determining one or more provisions of the functional safety standard; and identifying one or more signatures for each of the one or more provisions. For each provision, the processor may query the portion of the program for the corresponding one or more signatures. For each provision, the processor may determine a subscore based on the query for the corresponding one or more signatures, resulting in a set of subscores. Based on the set of subscores, the processor may generate the functional safety score.

20 Claims, 6 Drawing Sheets

(56) References Cited

U.S. PATENT DOCUMENTS

2021/0382814 A1 12/2021 Moondhra et al.
2022/0222071 A1* 7/2022 Dell'Osa .................. G06F 8/77

FOREIGN PATENT DOCUMENTS

DE 102019112734 A1 1/2020
DE 102020118479 A1 1/2022

* cited by examiner

AUTOMATING FUNCTIONAL SAFETY SCORING FOR APPLICATIONS

BACKGROUND

Functional safety requirements are often a crucial part of each automotive product development phase, ranging from the specification, to design, implementation, integration, verification, validation, and production release. The automotive product development may include the development of software applied in automotive systems. The functional safety requirements may be satisfied by compliance to standards defined by the International Organization for Standardization (ISO). One such standard is ISO 26262, an adaptation of the Functional Safety standard IEC 61508 for Automotive Electric/Electronic Systems. ISO 26262 defines functional safety for automotive equipment applicable throughout the lifecycle of all automotive electronic and electrical safety-related systems. Compliance to functional safety standards, like ISO 26262, may be assessed via certification and/or scoring of applications or components (e.g., subprograms) of applications. The certification and/or scoring may involve a number of procedures and checks to assess whether the application or the component of the application fulfills various provisions of the standard to be considered functionally safe.

SUMMARY

The present disclosure provides new and innovative systems and methods for automating scoring (e.g., for functional safety) in applications. In an example, a system for automating scoring (e.g., for functional safety) in applications includes a processor and a memory. The memory may store instructions that, when executed by the processor, cause the process to perform one or more processes. For example, the processor may detect a requirement to generate a score (e.g., for functional safety) for at least a portion of a program. The score may be based on a functional safety standard (e.g., the ISO 26262 standard). The processor may determine one or more provisions of the standard; and identify one or more signatures for each of the one or more provisions. For each provision, the processor may query the portion of the program for the corresponding one or more signatures. For each provision, the processor may determine a subscore based on the query for the corresponding one or more signatures, resulting in a set of subscores. Based on the set of subscores, the processor may generate the score (e.g., functional safety score). In some aspects, one or more of these processes (e.g., detecting the requirement and generating the score) may be performed in real time.

In some embodiments, the processor may determine the subscore based on the query by querying a base code associated with the at least the portion of the program for the one or more signatures corresponding to the provision. The processor may perform one or more of: determining whether a portion of the base code satisfies a similarity threshold with the one or more signatures corresponding to the provision; or identifying a number of times that the one or more signatures are found in the base code; and determining whether the number of times satisfies a predetermined threshold.

In some embodiments, the processor may detect the requirement by: monitoring a library of a plurality of programs for completion of standard compliance determination (e.g., functional safety determination); identifying, from the plurality of programs, the program as not having the completion of standard compliance determination (e.g., functional safety determination) for the at least the portion of the program; and retrieving, from the library of plurality of programs, the at least the portion of the program. For example, a change in a base code of the program may be detected. The change may comprise, involve, or otherwise be included within the at least the portion of the program. Also or alternatively, an update to the functional safety standard may be detected. Furthermore, the at least the portion of the program may not have the completion of standard compliance determination (e.g., functional safety determination) based on the update to the standard (e.g., functional safety standard). In some aspects, the score (e.g., the functional safety score) is continuously integrated with the at least the portion of the program.

In some embodiments, the processor may generate, based on the subscores, evidence for the score. In another embodiment, the processor may generate the score by: determining, for each provision, a respective weight assigned to the corresponding subscore for the provision; and integrating the subscores based on the respective weight assigned to the corresponding subscore of each subscore.

In an example, a method for automating scoring (e.g., for functional safety) in applications is disclosed. The method may include: detecting, by a computing device having a processor, a requirement to generate a score (e.g., for functional safety) for at least a portion of a program, wherein the score (e.g., functional safety score) is based on a standard (e.g., functional safety standard); determining, by the computing device, one or more provisions of the standard, and one or more signatures for each of the one or more provisions; identifying, one or more signatures for each of the one or more provisions; querying, for each provision, the portion of the program for the corresponding one or more signatures; determining, for each provision, a subscore based on the query for the corresponding one or more signatures, resulting in a set of subscores; and generating, based on the set of subscores, the score (e.g., the functional safety score).

In another example, a non-transitory computer-readable medium is disclosed for use on a computer system containing computer-executable programming instructions for performing one or more methods described herein.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

As previously discussed, functional safety requirements are often a crucial part of each automotive product development. Such automotive product development may include software implemented on LINUX operating systems to be applied on automotive systems. The fulfillment of functional safety requirements may be determined by certification or scoring of applications based on functional safety standards like ISO 26262. The certification or scoring may involve a number of checks or queries to be performed to demonstrate whether various provisions of the standard are being fulfilled in a program or subprogram to ensure that the program or subprogram is functionally safe. However, as applications for automotive systems may involve a large number of programs or subprograms that are continuously updated or created, and as functional safety scoring or certification is largely a manual process, there is a need to automate and continuously integrate functional safety scoring or certification for large volume of programs and subprograms requiring it.

The present disclosure describes solutions for effectively automating and continuously integrating functional safety scoring, which may allow larger volume of programs and subprograms to be automatically scored in real-time to effectively expedite automotive product development. For example, an application program or a portion of the application program (e.g., subprogram) requiring functional safety scoring may be automatically detected from a library of programs. A standard (e.g., ISO 26262) may be applied for the functional safety scoring, and various provisions of the standard may be identified, and signatures (e.g., corresponding sequences to look for in base code) may be determined based on the provisions. In an example embodiment, a computing device may run a number of tests and checks on the subprogram. Such tests and checks, referred to herein as queries, may include, for example, static code analysis tools, code converge reports, and the like. The queries may involve determining the presence and/or frequency of the signatures in the base code associated with the subprogram. The computing device may then compute a functional safety score based on the queries. The scoring may rely on a weights system to fine tune the importance and relevance of each of the queries and/or provisions, for the overall scoring of the program or subprogram. Since the scoring may be performed in real-time to the detection of subprograms needing functional safety scoring or certification in an ongoing application development, the scoring (and any certification based on the scoring) may be continuously integrated with the application development.

Figure 1:
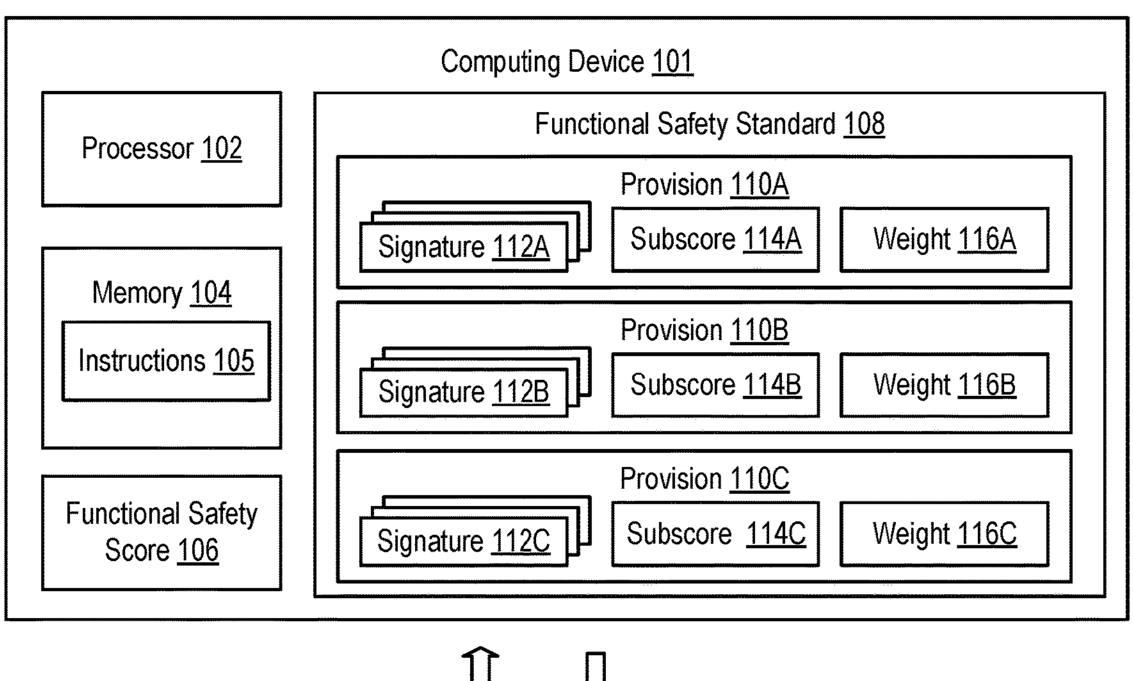
FIG. 1 is a block diagram showing a system for automating functional safety scoring in applications, according to an example embodiment of the present disclosure.
Figure 1:
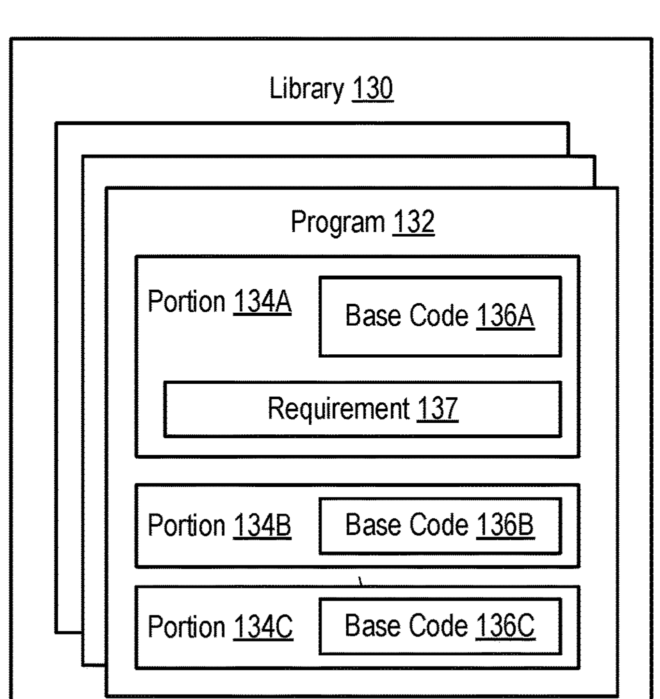

FIG. 1 is a block diagram showing a system for automating functional safety in applications, according to an example embodiment of the present disclosure.

As shown in FIG. 1, the system 100 may comprise a computing device 101 for automating functional safety in applications. The system 100 and/or the computing device 101 may include a processor 102 and a memory 104. The memory 104 may store instructions 105 that, when executed by the processor 102, may cause the processor 102 to perform one or more processes described herein. For example, the processor 102 may detect a requirement 137 to generate a functional safety score 106 for at least a portion of a program (e.g., portion 134A of program 132). It is contemplated that the program 132 may have other portions (e.g., portion 134B and 134C) that need not be tested or assessed at the time for compliance with the functional safety standard (e.g., need not have requirement 137), for example, because such portions may already have been already certified or recently scored for compliance to the functional safety standard. The detection may be based on the computing device 101 monitoring programs and/or portions of programs to see if any need to still be certified or scored for functional safety requirements. The programs and/or portions of programs may be stored in a library 130. Each portion of the program 132 may be associated with a respective base code (e.g., base code 136A-136C for portions 134A-134C, respectively). In some embodiments, the program 132 and/or the portion 134A of the program associated with the detected requirement 137 may be retrieved 118 by the computing device 101 from the library 130. For example, the base code 136A corresponding to the portion 134A may be retrieved for analysis.

The functional safety score 106 may be based on a functional safety standard 108 (e.g., the ISO 26262 standard). The processor 102 may determine one or more provisions (e.g., provisions 110A-110C) of the functional safety standard 108. For example, each provision may correspond to a separate rule or functional safety requirement that is must, should, may, or, recommended to be met by applications (e.g., for roadside safety). Furthermore, the processor 102 may identify one or more signatures for each of the one or more provisions (e.g., signatures 112A-112C for provisions 110A-110C, respectively). For each provision, the processor 102 may query the portion of the program (e.g., portion 134A) for the corresponding one or more signatures. For each provision, the processor 102 may determine a subscore based on the query for the corresponding one or more signatures, resulting in a set of subscores (e.g., subscores 114A-114C for provisions 110A-110C, respectively). Based on the set of subscores 112A-112C, the processor 102 may generate the functional safety score 106. In some aspects, one or more of these processes (e.g., detecting the requirement 137 and generating the functional safety score 106) may be performed in real time.

In some embodiments, the processor 102 may determine the subscores 112A-114C for provisions 110A-110C by querying the base code associated with the portion of the program associated with the detected requirement 137 (e.g., portion 134A) for the signatures 112A-112C corresponding to the various provisions 110A-110C. For example, for a given signature 112A the processor may determine whether a portion of the base code 136A satisfies a similarity threshold with the signature 112A. Also or alternatively, the processor 102 may identify a number of times that the signature 112A is found in the base code 136A and may determine whether the number of times satisfies a predetermined threshold. In some embodiments, certain subscores may be assigned higher or lower weights for the computation of the final functional safety score 106. The weights (e.g., weights 116A-116C) may be based on the relevance, urgency, and/or comprehensiveness of the corresponding provisions (e.g., provisions 110A-110C). The functional safety score 106 may then be continuously integrated 120 into the program 132 or portion 134A of the program 132, for example, so that the functional safety certification or scoring occurs concurrently with the product development of the program 132 or update to the program 132.

Figure 2:
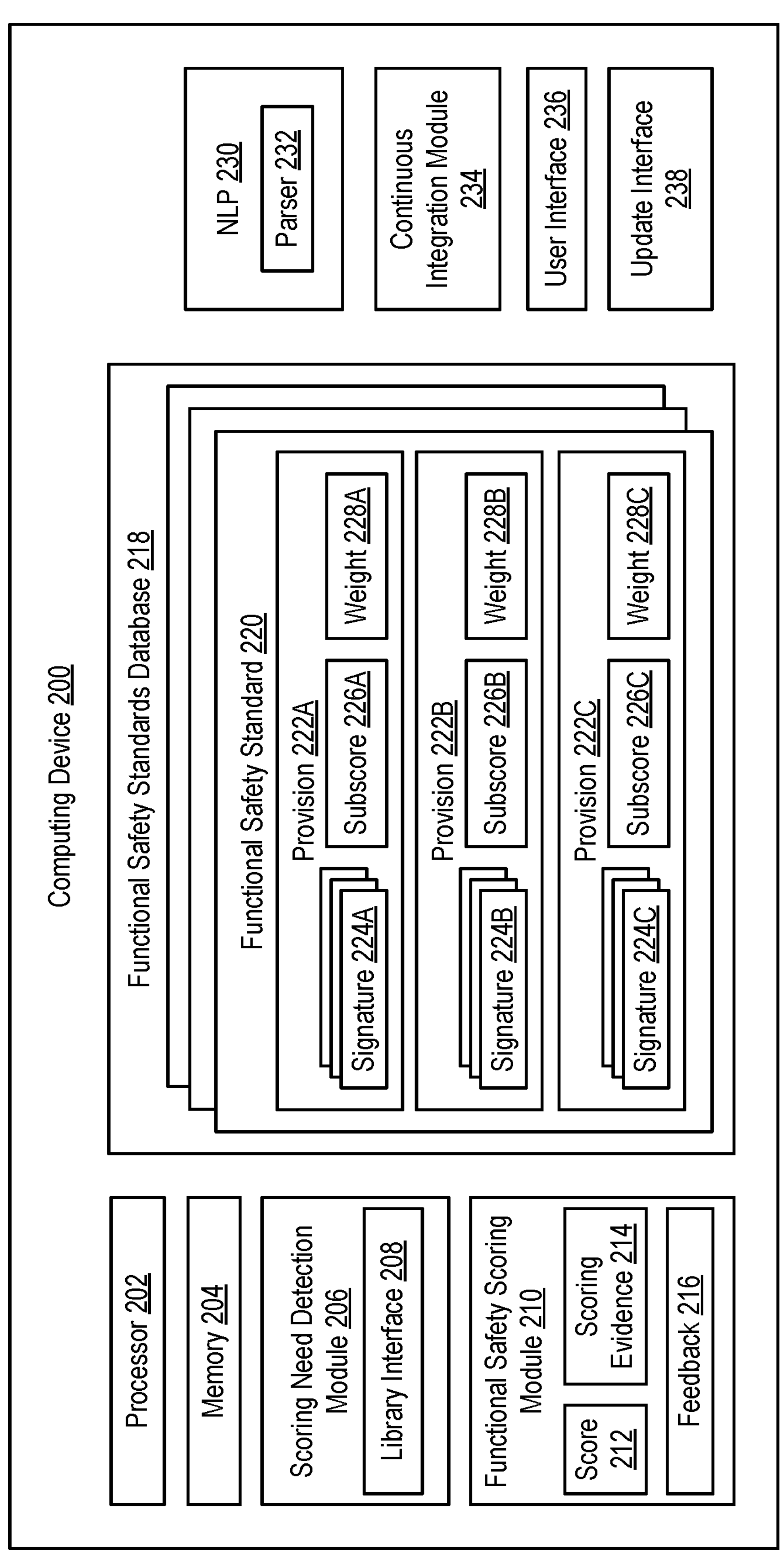
FIG. 2 is a block diagram showing one or more components of an example computing device or computing system used for automating functional safety scoring in applications, according to an example embodiment of the present disclosure.

FIG. 2 is a block diagram showing one or more components of an example computing device 200 used for automating functional safety in applications, according to an example embodiment of the present disclosure. For example, the computing device 200 shown in FIG. 2 may be an example of the computing device 101 shown in FIG. 1 for automating functional safety in applications, and may comprise, include, or share one or more components or functionalities as computing device 101. As shown in FIG. 2, the computing device 200 may include, for example, one or more of a processor 202, a memory 204, a scoring need detection module 206, a functional safety scoring module 210, a functional safety standards database 218, a natural language processor (NLP) 230, a continuous integration module 234, a user interface 236, and/or an update interface 238.

The processor 202 (also processor 102 of FIG. 1) may comprise any one or more types of digital circuit configured to perform operations on a data stream, including functions described in the present disclosure. The memory 204 (also memory 104) may comprise any type of long term, short term, volatile, nonvolatile, or other memory and is not to be limited to any particular type of memory or number of memories, or type of media upon which memory is stored. Furthermore, the memory 204 may store computer-executable instructions (e.g., instructions 105) that, when executed by the processor 202, can cause the processor 202 to perform one or more processes described herein.

The scoring need detection module 206 may comprise any portion or entirety of a software, application, program, or plug-in that causes the computing device (e.g., the processor 202) to detect (e.g., from library 130), a program or a portion of a program that has a need (e.g., a requirement 137) to be certified or scored for compliance with a functional safety requirement or standard. As such, in some aspects, the scoring need detection module 206 may include or may be associated with, a library interface 208 to allow the computing device 200 to query, search, retrieve, monitor, or otherwise facilitate communication with the library. The library may comprise an external or a cloud-based database or storage of programs. Also or alternatively, the library may be stored within or otherwise easily accessible by the computing device 200.

The functional safety scoring module 210 may comprise any portion or entirety of a software, application, program, or plug-in that causes the computing device 200 to automatically generate a functional safety score 212 for an application program or a portion of the application program based on compliance to a functional safety standard. In some embodiments, the functional safety scoring module 210 may further generate scoring evidence 214 and feedback 216 for the application program or portion of the application program. For example, the scoring evidence 214 may be based on subscores corresponding to various provisions of a functional safety standard. In some aspect, the feedback 216 may comprise a recommendation for making a program, which is found to be deficient in its compliance to a specific provision of a functional safety standard, compliant.

The functional safety standards database 218 may be a database, repository, or a stored list of functional safety standards (e.g., functional safety standard 220) (e.g., ISO 26262). The functional safety standards may include, in some aspects, different versions, variations, or related standards. The functional safety standards database 218 may store, for a given functional safety standard 220, a plurality of provisions 224A-224C of the functional safety standard 220. The provisions 224A-224C may pertain to a separate rules, topics, or functional safety requirements that must, should, may, or, is recommended to be met by applications to be scored or certified (e.g., for roadside safety). As signatures are generated for each provision, in order to allow the computing device to be able to perform queries in the base code of the program or subprogram to be tested, such signatures may be stored in the functional standards database 218 (e.g., signatures 224A-224C). As different subscores are generated based on the assessment of how well a subprogram or portion of an application complies with a given provision, the subscores may be stored in the functional safety standards database 218 (e.g., subscores 226A-226C). In some aspects, the functional standards database 218 may also store or record the weights 228A-228C to be assigned to the different provisions 222A-222C of a functional safety standard 220. The weights 228A-228C may indicate how relevant, urgent, and/or comprehensive a given provision is relative to other provisions, and/or how much the subscore of the given provision should be given weight with respect to the other provisions, when computing the functional safety score.

The natural language processor (NLP) 230 may comprise one or more processors, processing units, programs, applications, and/or plug-ins for processing and analyzing natural language data (e.g., textual natural language). The NLP may include for example, a parser 232 (e.g., a lexer, tokenizer, etc.) to determine, from a string of inputted natural language, recognizable tokens for processing by the computing device 200. For example, the NLP 230 may be used to process receive and store functional safety standards (e.g., from external systems), identify and store provisions of the functional safety standards, and generate and store signatures for performing queries.

The continuous integration module 234 may comprise any portion or entirety of a software, application, program, or plug-in that causes the computing device (e.g., the processor 202) to incorporate any generated functional safety scores or assessments (e.g., score 212), scoring evidence 214, and/or feedback 216, for any program or subprogram being assessed, as part of the product development of the program or subprogram, such that the program or subprogram can be developed in an agile process. For example, may function as a shared repository (e.g., a build server) for any incoming updates to a code for an ongoing application development process, where such updates can be continually tested for functional safety and the results of the testing can be documented in real-time.

The user interface 236 may comprise any application, program, software, code, or plug-in used to allow a user or operator of the software development operations process associated with the program or subprogram being tested for functional safety to be kept aware of the status and results of the functional safety testing. For example, the user interface 236 may include a dashboard, a window, and/or a graphical user interface showing the functional safety score 212, scoring evidence 214, and/or any feedback 216 associated with the score 212.

The update interface 238 may comprise any application, program, software, code, or plug-in used to allow an operator or an external system to update one or more databases (e.g., functional safety standards database 218) of the computing device 200. For example, the update interface 238 may allow an operator to enter or correct, any signatures chosen for a specific provision of a functional safety standard, in order to facilitate the queries better. Also or alternatively, the update interface 238 may allow the computing device 200 to update its stored functional safety standards 220 (e.g., if newer versions are detected from an external server).

It is contemplated that in various embodiments, one or more of the components of computing device 200 need not be located within the computing device 200. For example, the components may be on a server or cloud platform accessible by or provisioned by the computing device 200.

Figure 3:
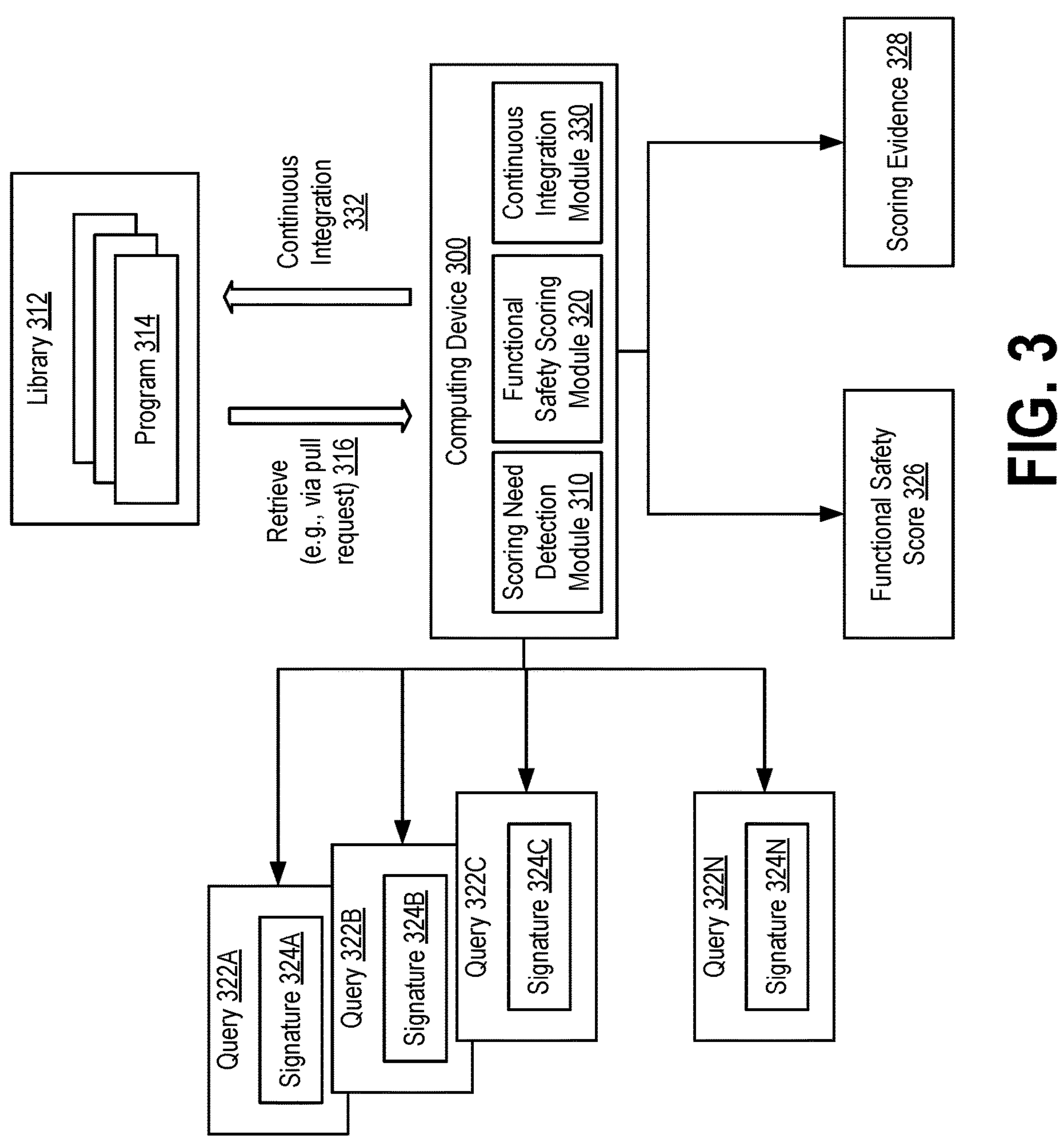
FIG. 3 is a schematic illustrating interactions between various components of a system for automating functional safety scoring in applications, according to an example embodiment of the present disclosure.

FIG. 3 is a schematic illustrating interactions of the computing device 300 for automating functional safety in applications, according to an example embodiment of the present disclosure. The computing device 300 shown in in FIG. 3 may comprise or be an example of computing device 200 shown in FIG. 2 and computing device 101 shown in FIG. 1 for automating functional safety in applications, and may comprise, include, or share one or more components or functionalities as computing device 200/101. For example, of particular relevance to FIG. 3, the computing device 300 may include a scoring need detection module 310 (e.g., sharing the functionalities of scoring need detection module 206), a functional safety scoring module 320 (e.g., sharing the functionalities of functional safety scoring module 210), and a continuous integration module 330 (e.g., sharing the functionalities of continuous integration module 234).

The interactions may involve that between the computing device 300 and a library 312. The library 312 may comprise a repository, database, or storage of programs 314 (including subprograms) undergoing software development. Such programs 314 may pertain to applications for automotive systems. In some aspects, such programs 314 may pertain to other industries where functional safety standards (e.g., ISO 26262) may be relevant.

The interactions may involve the computing device retrieving a program or subprogram from the library 312 to begin an assessment for functional safety (e.g., interaction 316). In some aspects, the retrieval may be facilitated via a PULL request. In some embodiments, the retrieval may be prompted by the computing device 300 detecting (e.g., via the scoring need detection module 310), a requirement for the program (that is to be received) to fulfill a functional safety certification. For example, the computing device may periodically monitor various programs 314 under development and recognize when there is a program or subprogram (e.g., an update to the program) that has not yet been certified. A program or subprogram would thus require certification (e.g., and the computing device 300 would detect the requirement) if the program or subprogram is found to not yet be certified. In one aspects, the status of whether a program has been scored for functional safety (or certified for functional safety) may be identifiable via metadata stored in the program. The metadata may be entered into programs by way of continuous integration when a program completes functional safety certification using the processes discussed herein.

After retrieval, the computing device (e.g., by way of the functional safety score module 320) may identify a functional safety standard to be used for the automated functional safety assessment process. For example, the computing device 300 may identify, from its functional safety standards database 218, a relevant functional safety standard 220 to apply based on the nature of the program to be assessed, and may identify various provisions of the functional safety standard. Furthermore, the computing device 300 may generate signatures for each of the provisions. In one embodiment, the signatures may comprise search criteria, keywords, key tokens, and/or patterns to look for in the base code corresponding to the program, in order to determine whether the base code complies with a given provision.

The computing device 300 may thus generate a plurality of queries that may each involve a signature that the computing device 300 looks for in the base code (e.g., queries 322A-322N associated with signatures 324A—324N, respectively). In some embodiments, the queries may result in determinations of whether the base code having (e.g., as a portion of the base code) a sequence that corresponds with the signature, a number of times such sequences are found, or a degree of similarity between a given sequence and the signature. Such determinations may aid in generating a subscore corresponding to the provision associated with the signatures. After queries are sent for each provision, the computing device may 300 may generate a functional safety score 326. In some aspects, methodologies for how the functional safety score 326 is computed, such as the subscores and any weights associated with the subscores, may also be generated as scoring evidence 328.

The computing device 300 may then incorporate the functional safety score 326 and any scoring evidence 326 into the program or subprogram undergoing software development via continuous integration 332 (e.g., via the continuous integration module 330). For example, the functional safety score 326 may be included as metadata into the program or subprogram (e.g., update to the program). In some aspects, if the functional safety score 326 is above a predefined threshold, the program or subprogram may be deemed as "certified" and this may be indicated via metadata stored in the program.

In some embodiments, the functional safety scoring module 320 and/or the computer-executable instructions for generating the functional safety score may be a plug-in for another system or engine configured to generate the provisions or rules of the functional safety standard. Also or alternatively, the other system may be configured to generate the signatures associated with the provisions or rules for the functional safety standard. Thus, the systems and methods described herein for automating functional safety scoring in applications can be easily implemented as a plug-in, or substitutable module, within larger systems managing or processing the rules for functional safety standards.

Figure 4:
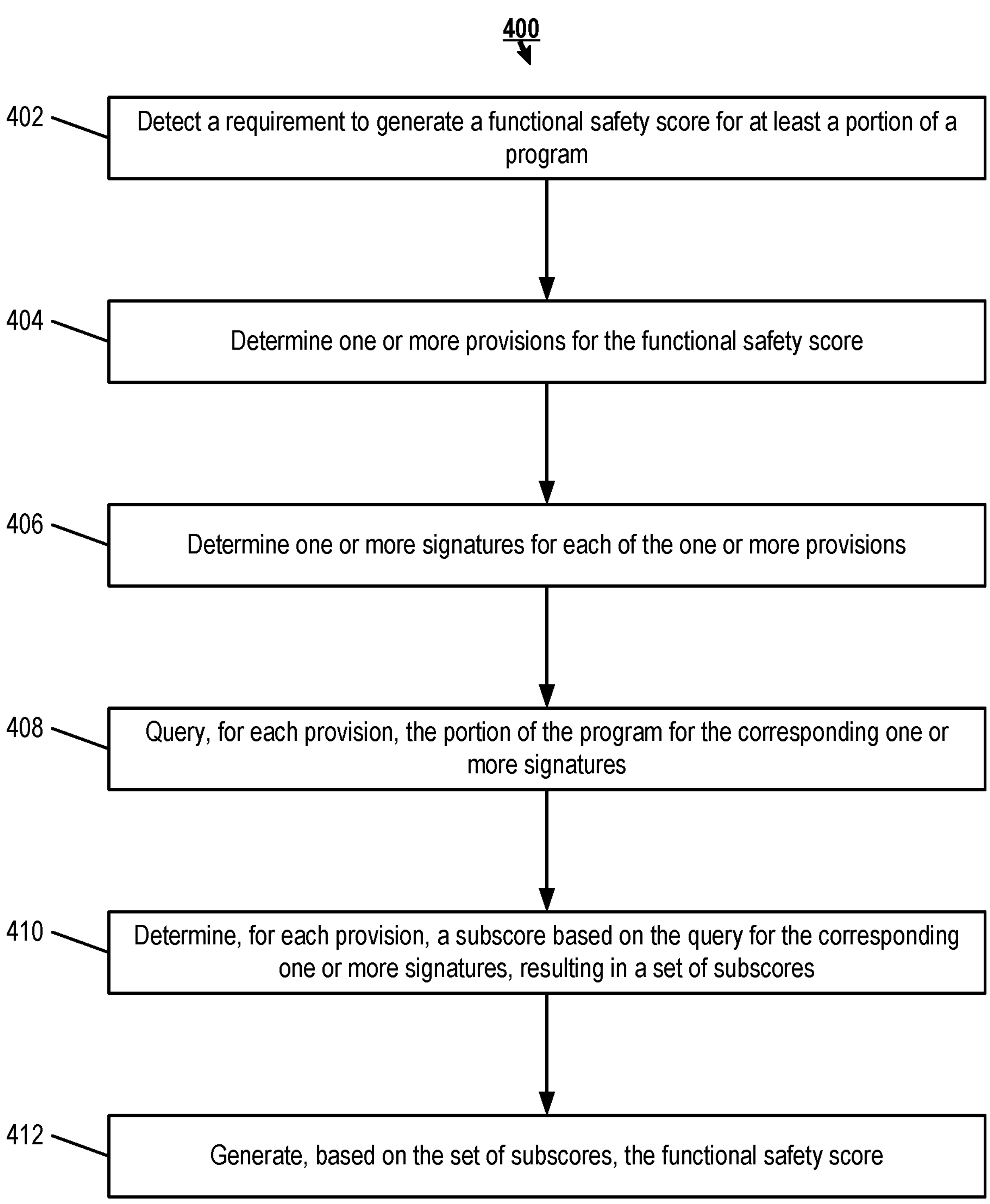
FIG. 4 is a flow chart illustrating an example process for automating functional safety scoring in applications, according to an example embodiment of the present disclosure.

FIG. 4 is a flow chart illustrating an example process 400 for automating functional safety in applications, according to an example embodiment of the present disclosure. Process 400, shown in FIG. 4, may be performed by a processor of the computing device or computing system used for automating functional safety in applications (e.g., processor 102 of computing device 101 or processor 202 of computing device 200, processor), based on computer-readable or computer executable instructions stored in a memory of the computing system or computing device (e.g., memory 104 of system 100 or memory 204 of computing device 200). For simplicity, "computing device" may be referred to as performing one or more steps of process 400.

Process 400 may begin with the computing device 101/200 detecting a requirement to generate a functional safety score for at least a portion of a program (block 402). The functional safety score 106 may be based on a functional safety standard 108 (e.g., the ISO 26262 standard). Compared to other portions of the program, which may already have been already certified or recently scored for compliance to the functional safety standard, the portion being detected may not yet have been certified or scored, and may hence possess a requirement to be certified or scored (e.g., to have a functional safety score generated). The detection may be based on the computing device 101/200 monitoring programs and/or portions of programs to see if any need to still be certified or scored for functional safety requirements. In some embodiments, the program and/or the portion of the program associated with the detected requirement may be retrieved by the computing device 101/200 (e.g., from the library 130).

At block 404, the computing device 101/200 may determine one or more provisions (e.g., of the functional safety standard). For example, each provision may correspond to a separate rule, topic, or functional safety requirement of the standard that must, should, may, or, is recommended to be met by the program.

Furthermore, the processor 102 may identify one or more signatures for each of the one or more provisions (block 406). The signatures for a given provision may comprise search criteria, keywords, key tokens, and/or patterns for the computing device 101/200 to look for in the base code corresponding to the program, in order to determine whether the program (e.g. any portion of its base code) complies with the given provision.

At block 408, the computing device 101/200 may query, for each provision, the portion of the program for the corresponding one or more signatures. For example, the computing device may rely on the parser to 232 to determine whether any sequence of the base code of the program corresponds with a signature associated with the query.

At block 410, the computing device 101/200 may determine, for each provision, a subscore based on the query for the corresponding one or more signatures, resulting in a set of subscores (e.g., an independent subscore for each respective provision). In some embodiments, the computing device 101/200 may determine the subscores for the respective provisions by querying the base code associated with the portion of the program associated with the detected requirement for the signatures corresponding to the various provisions of the functional safety standard. For example, for a given signature, the computing device 101/200 may determine whether a portion of the base code satisfies a similarity threshold with the signature. Also or alternatively, the computing device 101/200 may identify a number of times that the signature is found in the base code and may determine whether the number of times satisfies a predetermined threshold. In some embodiments, certain subscores may be assigned higher or lower weights for the computation of the final functional safety score. The weights may be based on the relevance, urgency, and/or comprehensiveness of the corresponding provisions.

At block 412, the computing device 101/200 may generate, based on the set of subscores, the functional safety score. In some aspects, one or more of these processes (e.g., detecting the requirement and generating the functional safety score) may be performed in real time. The functional safety score may then be continuously integrated into the program or portion of the program (e.g., via continuous integration module 234/330), for example, so that the functional safety certification or scoring occurs concurrently with the product development of the program 132 or update to the program 132.

Figure 5:
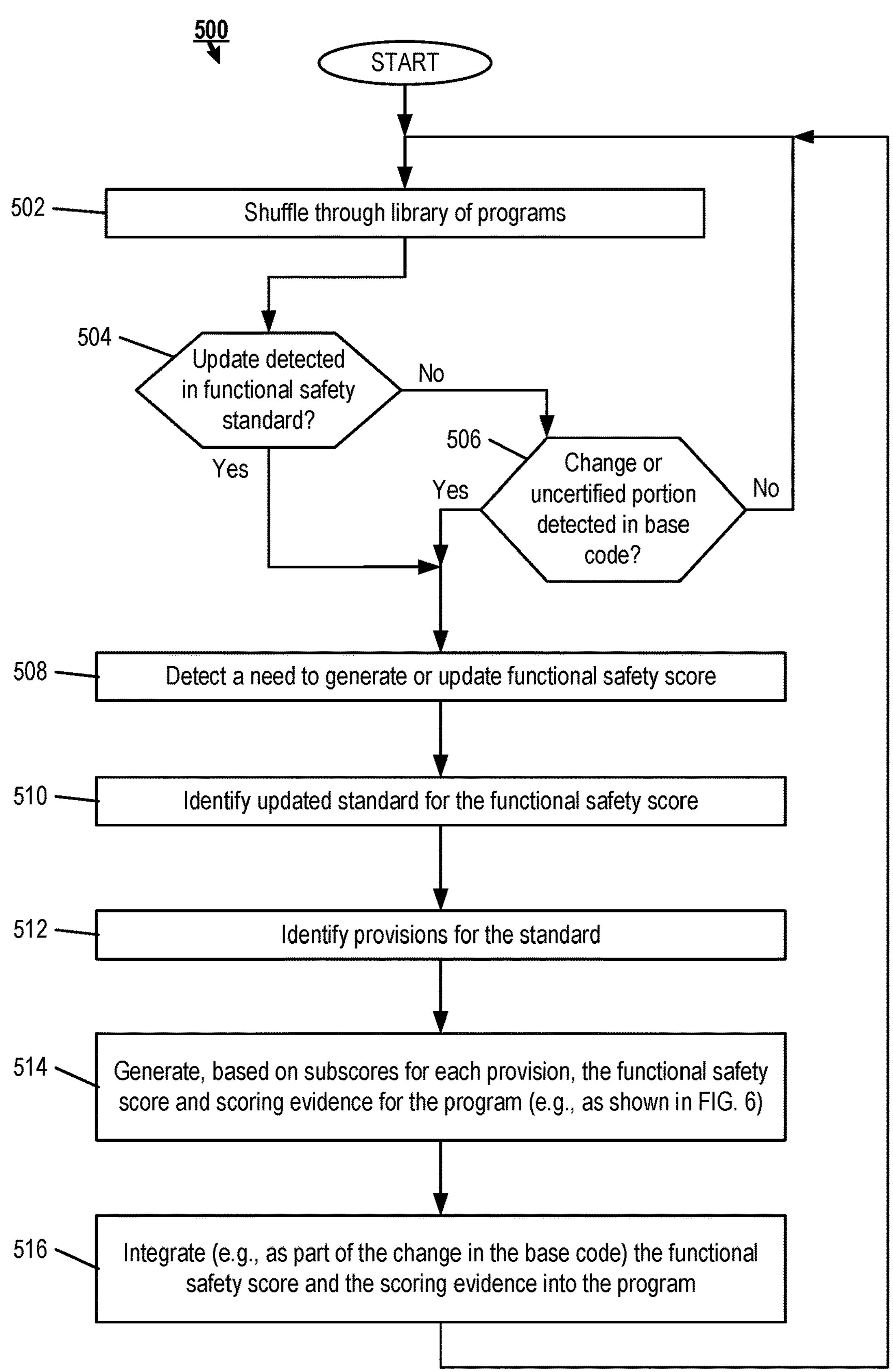
FIG. 5 is a flow chart illustrating another example process for automating functional safety scoring in applications, according to an example embodiment of the present disclosure.

FIG. 5 is a flow chart illustrating another example process 500 for automating functional safety in applications, according to an example embodiment of the present disclosure. One or more steps or methods of process 500 may be performed by a processor of the computing device or computing system used for automating functional safety in applications (e.g., processor 102 of computing device 101 of system 100 or processor 202 of computing device 200, processor), based on computer-readable or computer executable instructions stored in a memory of the computing system or computing device (e.g., memory 104 of system 100 or memory 204 of computing device 200). For simplicity, "computing device" may be referred to as performing one or more steps of process 500. Specifically, process 500 is an example embodiment of process 400, where process 500 contextualizes process 400 within interactions continually occurring between the computing device and a library of programs undergoing application development.

Process 500 may begin with the computing device 101/200 shuffling through a library of programs (block 502). For example, the computing device 101/200 may periodically and/or continuously select a program from a list of programs stored in library 130/312. The selection may be randomized or may follow a predefined sequence. For example, the predefined sequence may involve the computing device 101/200 starting with a program that had been previously selected the longest time ago, and ending with a program that had been selected most recently prior to the sequence.

For each selection during the shuffling, the computing device may detect whether there is a standing requirement (e.g., a need) to generate or update a functional safety score (referred to herein as "requirement") (block 508). The detection may be based on a one or more factors associated with any given program during the shuffling. As shown in FIG. 500, those factors may include, in one example, a determination of whether a functional safety standard was recently updated (block 504). For example, if one or more programs in the library have been certified based on a certain version of a functional safety standard, but the computing device determines that there is an updated version of the functional safety standard (e.g., due to new provisions being added, or provisions being modified), then it is contemplated that the one or more programs may not necessarily be certified based on the updated functional safety standard (e.g., because whether the one or more programs complies with the new or modified provisions is yet to be determined). Thus, if an update to a functional safety standard is detected, the computing device 101/200 may deem that there is a need to generate or update the functional safety score of a selected program (i.e., the selected program has a standing requirement to be certified) (block 508).

Also or alternatively, the detection may be based on the computing device 101/200 determining that there is a change in a base code associated with a given program and/or an uncertified portion detected in the base code associated with the given program (block 506). For example, as may be expected in agile software development, as programs are updated, modified, or augmented with new code, the changes may need to be assessed for compliance with the functional safety standard. Furthermore, the change or added portion of the program may need to be certified, even if the older or remaining portions of the program have already been certified. Thus if changes and/or uncertified portions are detected, the computing device may deem that there is a need to generate or update the functional safety score of a selected program (i.e., the selected program has a standing requirement to be certified) (block 508).

At block 510, the computing device 101/200 may identify an updated standard to be used for the assessment process (e.g., for the generation of the functional safety score). For example, the computing device 101/200 may retrieve or obtain the updated standard identified from block 504. Also or alternatively, the computing device 101/200 may determine (e.g., by searching the functional safety standards database 218 or by contacting an external server associated with functional safety standards), whether it has the most updated (e.g., current) version of the functional safety standard.

Furthermore, at block 512, the computing device 101/200 may identify provisions for that functional safety standard. For example, the natural language processor 230 may parse a retrieved or obtained functional safety standard (e.g., via parser 232) to recognize (e.g., within the natural language of the standard) sections of the standard corresponding to the provision. Each provision may correspond to a separate rule, topic, or functional safety requirement of the standard that must, should, may, or, is recommended to be met by the program. For example, for some versions of the ISO 26262 standard, provisions may include but are not limited to: provisions for static code analysis, cod convergence, etc.

At block 514, the computing device 101/200 may generate, based on subscores for each identified provision, the functional safety score and scoring evidence for the program. For example, signatures based on each provision may be used to query the base code of the program for instances, frequencies, and correspondences of the signature, to determine subscores for each provision. Then the computing device 101/200 may integrate the subscores for each provision to generate a functional safety score, and may factor in weights assigned to each provision. Process 600, which will be described in relation to FIG. 6, describes an example embodiment of block 514.

At block 516, the computing device 101/200 may integrate the functional safety score and scoring evidence into the program. For example, the functional safety score may be included as metadata into the program or subprogram (e.g., update to the program) that had been selected based on the detection in blocks 502 through 508. In some aspects, if the functional safety score is above a predefined threshold, the program or subprogram may be deemed as "certified" and this may be indicated in the metadata stored in the program. Since the functional safety scoring (assessment) process may be triggered when the computing device 101/200 detects any changes in the base code of a program (e.g., as the program is being developed), the resulting integration of the functional safety score into the program may thus be a part of the software development process, thereby making the functional safety scoring and integration a continuous integration into the software development process of the program. For example, after the integration, the computing device 101/200 may once again monitor programs (e.g., by shuffling through programs of the library at block 502), for any changes or uncertified portions of the base code or for any updates to the functional safety standards.

Figure 6:
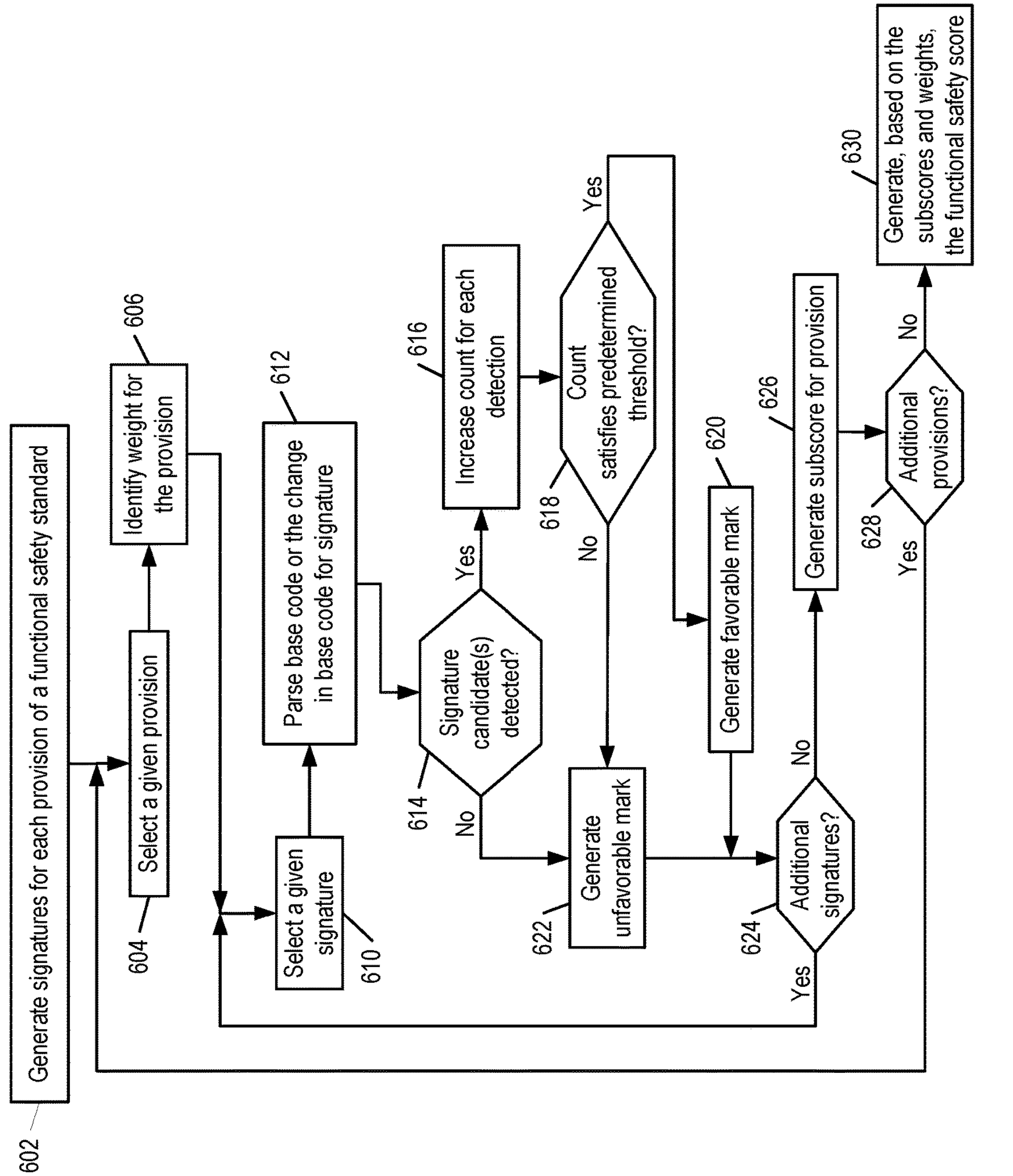
FIG. 6 is a flow chart illustrating an example process for generating a functional safety score and scoring evidence, according to an example embodiment of the present disclosure.

FIG. 6 is a flow chart illustrating an example process 600 for generating a functional safety score and scoring evidence, according to an example embodiment of the present disclosure. In particular, process 600 includes an example process for performing block 514 of process 500 of FIG. 5. One or more steps or methods of process 600 may be performed by a processor of the computing device or computing system used for automating functional safety in applications (e.g., processor 102 of computing device 101 of system 100 or processor 202 of computing device 200, processor), based on computer-readable or computer executable instructions stored in a memory of the computing system or computing device (e.g., memory 104 of system 100 or memory 204 of computing device 200). For simplicity, "computing device" may be referred to as performing one or more steps of process 600.

In some embodiments, process 600 may begin, for example, after a functional safety standard has been identified (e.g., block 510 of FIG. 5) for applying to a program in order to assess the program's compliance with the functional safety standard, and after provisions of the functional safety standard have been identified or determined (e.g., block 512 of FIG. 5).

Process 600 may begin with the computing device 101/200 generating signatures for each provision of the functional safety standard (block 602). The signatures may comprise search criteria, keywords, key tokens, and/or patterns to look for in the base code corresponding to the program, in order to determine whether the base code complies with a given provision.

At block 604, the computing device 101/200 may select a given provision (e.g., of a plurality of more provisions identified from the functional safety standard). The provision may be selected randomly or based on a predefined methodology. At block 606, the computing device 101/200 may identify a weight for the provision. For example, some provisions may be more important, urgent, and/or comprehensive than other provisions for functional safety, and the degree of importance, urgency, and/or comprehensiveness may be quantified. In some aspects, such degrees may be inputted into the functional safety standards 218 (e.g., via user interface 236), or may be provided or indicated in the functional safety standard itself. In some embodiments, the computing device 101/200 may be able to learn the degree of importance, urgency, and/or comprehensiveness of any given provision, e.g., via supervised machine learning. For example, various features of a provision, including its length, or its use of certain terms (e.g., "necessary," "must," "shall," etc.), or order in which such provisions are laid out in the standard may be used to predict the degree of importance, urgency, and/or comprehensiveness of the provision relative to other provisions and therefore the weight of the provision. Such features may be recognized via the natural language processor 230.

Blocks 610 through 624 may pertain to queries performed on the base code of the program being assessed, based on each signature generated for the provision. Thus, blocks 610 through 624 may be repeated for each signature of the provision until queries for each signature has been performed. Thus, at block 610, the computing device 101/200 may select a given signature from one or more signatures generated for a given provision. The selection of a signature (from those signatures for which queries have not been performed yet) may be random or may be based on a predefined methodology. At block 612, the computing device 101/200 may parse the base code of the program or the change in the base code of the program for the signature. For example, the change in the base code of the program may correspond to new development, addition, modification, or update to a program in the course of a software development operation. The computing device 101/200 may parse the base code or change in the base code (e.g., using parser 232 of NLP 230) by breaking the base code into lexicons and/or tokens.

Then the computing device 101/200 may determine whether any sequence or arrangement of the lexicons and/or tokens match (e.g., to a similarity threshold) the signature. The matching or corresponding portion of the base code (e.g., that satisfies a similarity threshold with the signature) may be referred to as a signature candidate. Thus, based on the parsing of the base code or change in the base code, the computing device 101/200 may determine whether one or more signature candidates are detected within the base code (block 614).

If detected, the computing device 101/200 may increase a count for each detection (block 616). For example, if the signature involves a problematic code sequence, and such code sequence is detected three times within the base code, the computing device 101/200 may register a count of three. The computing device 101/200 may then determine whether the count satisfies a predetermined threshold (block 618). The satisfaction may be based on whether the signature candidate is problematic to have in the base code (e.g., where more instances of the signature candidate is unfavorable) or beneficial to have in the base code (e.g., where more instances of the signature candidate is favorable). Satisfaction of the predetermined threshold may thus be in the direction of producing a favorable outcome whether it is achieving a count less than a predetermined threshold or more than a predetermined threshold. If the count satisfies the predetermined threshold, the computing device 101/200 may generate a favorable mark (e.g., a favorable factor or a favorable sub-subscore for a subscore) (block 620). However, if the count does not satisfy the predetermined threshold, the computing device may generate an unfavorable mark (e.g., an unfavorable factor or an unfavorable sub-subscore for a subscore) (block 622).

Blocks 610 through 624 may thus continue for other signatures generated for the given provision, until the computing device 101/200 determines that there are no additional signatures (block 624). At that point, the computing device may generate a subscore for the provision (block 626). The subscore may be based on a sum of and/or may otherwise account for the various favorable and unfavorable marks generated as each signature is analyzed. At block 628, the computing device 101/200 may determine whether there are additional provisions of the standard to be analyzed (e.g., for generating subscores). If there are, blocks 604 through 626 may be repeated for those provisions. Otherwise, the computing device 101/200 may generate, based on the subscores and weights, the functional safety score (block 630). In some embodiments, a weight for a provision may comprise a value that the subscore for the provision may be multiplied with. The resulting products, for each provision, may be summed together to derive the functional safety score. In some embodiments, if the functional safety score is above a predefined threshold, the program or subprogram that was scored may be deemed as "certified" for functional safety. In yet another embodiment, the computing device 101/200 may further generate scoring evidence 214 for the functional safety program. The scoring evidence 214 may comprise or may be based on subscores corresponding to various provisions of a functional safety standard. For example, the scoring evidence may be a textual, visual, and/or graphical presentation the various components of the functional safety score, where the components may correspond to the provisions and thus have a respective subscore. The scoring evidence can thus provide, e.g., by avoiding subjective characterizations, a quantitative and objective basis for why a program or a portion of a program received the functional safety score.

Although examples are described in the foregoing description in the context of functional safety standards, embodiments of the disclosure may be used for compliance with any standards. Thus, wherever embodiments are described using "functional safety standards" or "functional safety scores," the present disclosure also contemplates aspects of those embodiments using standards or scores other than functional safety standards or functional safety scores, respectively.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is as follows:

1. A method comprising:

storing, by a computing device, base code for an application program in memory, the base code including program instructions for imparting functionality to the application program;

detecting, by the computing device, a triggering event to generate a score associated with the application program, wherein the score indicates a level of compliance with a functional safety standard; and in response to detecting the triggering event, automatically:

determining, by the computing device, one or more provisions of the functional safety standard, wherein the one or more provisions include rules or functional safety requirements of the functional safety standard;

identifying, by the computing device, one or more corresponding signatures for each of the one or more provisions of the functional safety standard;

querying, by the computing device the stored base code for the one or more corresponding signatures for each provision of the one or more provisions of the functional safety standard;

determining, by the computing device and for each provision, a subscore based on the query for the one or more corresponding signatures, resulting in a set of subscores;

generating, by the computing device and based on the set of subscores, the score;

based on the score, determining, by the computing device, that the application program is deficient with respect to the functional safety standard; and based on determining that the application program is deficient with respect to the functional safety standard, generating, by the computing device, feedback for making the application program compliant with the functional safety standard.

2. The method of claim 1, wherein determining the subscore for a provision of the one or more provisions comprises:

determining whether a portion of the base code satisfies a similarity threshold with the one or more corresponding signatures for the provision.

3. The method of claim 1, wherein the detecting the triggering event and the generating the score is performed in real time.

4. The method of claim 1, further comprising, wherein the detecting the triggering event comprises:

monitoring a library of a plurality of programs for completion of a standard compliance determination;

identifying, from the plurality of programs, the application program as not having completed the standard compliance determination; and based on identifying the application program as not having completed the standard compliance determination, retrieving, from the library of the plurality of programs, the application program for evaluation.

5. The method of claim 1, wherein the triggering event includes an update to the functional safety standard.

6. The method of claim 1, wherein the score is integrated into metadata for the application program.

7. The method of claim 1, further comprising:

generating, based on the subscores, evidence for the score.

8. The method of claim 1, wherein generating the score comprises:

determining, for each provision of the one or more provisions, a respective weight assigned to the corresponding subscore for the provision; and integrating the subscores based on the respective weight assigned to the corresponding subscore for each provision.

9. The method of claim 1, wherein the functional safety standard is the ISO 26262 standard.

10. The method of claim 1, wherein the score is generated by a plug-in for a module that determines the one or more provisions of the functional safety standard or identifies the one or more corresponding signatures.

11. A system comprising:

a processor; and a memory storing instructions that, when executed by the processor, cause the processor to:

store base code for an application program in the memory, the base code including program instructions for imparting functionality to the application program;

detect a triggering event to generate a score associated with the application program, wherein the score indicates a level of compliance with a functional safety standard; and in response to detecting the triggering event, automatically:

determine one or more provisions of the functional safety standard, wherein the one or more provisions include rules or functional safety requirements of the functional safety standard;

identify one or more corresponding signatures for each of the one or more provisions of the functional safety standard;

query the stored base code for the one or more corresponding signatures for each provision of the one or more provisions of the functional safety standard;

determine, for each provision, a subscore based on the query for the one or more corresponding signatures, resulting in a set of subscores;

generate the score associated with the application program based on the set of subscores;

based on the score, determine that the application program is deficient with respect to the functional safety standard; and based on determining that the application program is deficient with respect to the functional safety standard, generate feedback for making the application program compliant with the functional safety standard.

12. The system of claim 11, wherein the instructions, when executed, cause the processor to determine the subscore for a provision of the one or more provisions by:

identifying a number of times that the one or more corresponding signatures are found in the base code and determining whether the number of times satisfies a predetermined threshold.

13. The system of claim 11, wherein the instructions, when executed, cause the processor to detect the triggering event by:

monitoring a library of a plurality of programs for completion of standard compliance determination;

identifying, from the plurality of programs, the application program as not having completed the standard compliance determination; and based on identifying the application program as not having completed the standard compliance determination, retrieving, from the library of the plurality of programs, the application program for evaluation.

14. The system of claim 13, wherein the triggering event includes a change in the base code of the application program.

15. The system of claim 14, wherein the score is integrated into metadata stored along with the application program.

16. The system of claim 11, wherein the instructions, when executed, further cause the processor to:

generate, based on the subscores, evidence for the score.

17. The system of claim 11, wherein the instructions, when executed, cause the processor to generate the score by:

determining, for each provision of the one or more provisions, a respective weight assigned to the corresponding subscore for the provision; and integrating the subscores based on the respective weight assigned to the corresponding subscore for each provision.

18. The system of claim 11, wherein the functional safety standard is for a vehicle.

19. A non-transitory computer readable medium storing program code that is executable by one or more processors for causing the one or more processors to:

store base code for an application program in memory, the base code including program instructions for imparting functionality to the application program;

detect a triggering event to generate a score associated with the application program, wherein the score indicates a level of compliance with a functional safety standard; and in response to detecting the triggering event, automatically:

determine one or more provisions of the functional safety standard, wherein the one or more provisions include rules or functional safety requirements of the functional safety standard;

identify one or more corresponding signatures for each of the one or more provisions of the functional safety standard;

query the stored base code for the one or more corresponding signatures for each provision of the one or more provisions of the functional safety standard;

determine, for each provision, a subscore based on the query for the one or more corresponding signatures, resulting in a set of subscores;

generate the score associated with the application program based on the set of subscores;

based on the score, determine that the application program is deficient with respect to the functional safety standard; and based on determining that the application program is deficient with respect to the functional safety standard, generate feedback for making the application program compliant with the functional safety standard.

20. The method of claim 1, wherein the one or more provisions of the functional safety standard are determined by executing a machine-learning model that performs natural-language processing on the functional safety standard.

* * * * *